United States Patent
Yanagihara et al.

(10) Patent No.: US 11,273,825 B2
(45) Date of Patent: Mar. 15, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Suguru Yanagihara, Wako (JP); Takayasu Kumano, Wako (JP); Takuya Niioka, Wako (JP); Kazuma Ohara, Wako (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 16/672,629

(22) Filed: Nov. 4, 2019

(65) Prior Publication Data
US 2020/0164872 A1 May 28, 2020

(30) Foreign Application Priority Data

Nov. 26, 2018 (JP) .............................. JP2018-219928

(51) Int. Cl.
*B60W 30/09* (2012.01)
*B60W 30/095* (2012.01)
*B60W 30/18* (2012.01)
*G05D 1/02* (2020.01)
(Continued)

(52) U.S. Cl.
CPC ........ *B60W 30/09* (2013.01); *B60W 30/0956* (2013.01); *B60W 30/146* (2013.01);
(Continued)

(58) Field of Classification Search
CPC ............. B60W 30/09; B60W 30/0956; B60W 30/146; B60W 30/18154;
(Continued)

(56) References Cited

U.S. PATENT DOCUMENTS 6,405,131 B1 * 6/2002 Barton ............... G01C 21/3626
340/988
6,611,753 B1 * 8/2003 Millington ......... G01C 21/3632
701/436
(Continued)

FOREIGN PATENT DOCUMENTS

JP 07-192193 7/1995
JP 10-274545 10/1998
(Continued)

OTHER PUBLICATIONS

Japanese Office Action for Japanese Patent Application No. 2018-219928 dated Oct. 6, 2020.
Japanese Office Action for Japanese Patent Application No. 2018-219928 dated Jul. 6, 2021.

*Primary Examiner* — Anshul Sood
(74) *Attorney, Agent, or Firm* — Amin, Turocy & Watson, LLP

(57) ABSTRACT

A vehicle control device includes a recognizer configured to recognize a surrounding situation of a vehicle and a driving controller configured to control acceleration, deceleration, and steering of the vehicle independently of an operation of an occupant of the vehicle on the basis of a recognition result of the recognizer. When it is recognized that the vehicle passes through a complex intersection where two or more intersections are combined by turning left or right at the complex intersection, the recognizer excludes at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection.

6 Claims, 9 Drawing Sheets

(51) Int. Cl.
  *G06K 9/00* (2006.01)
  *B62D 15/02* (2006.01)
  *B60W 30/14* (2006.01)

(52) U.S. Cl.
  CPC ... *B60W 30/18154* (2013.01); *B62D 15/0265* (2013.01); *G05D 1/0214* (2013.01); *G06K 9/00825* (2013.01)

(58) Field of Classification Search
  CPC ......... B60W 30/18159; B62D 15/0265; G05D 1/0214; G06K 9/00825
  See application file for complete search history.

(56) References Cited

U.S. PATENT DOCUMENTS

| | | | |
|---|---|---|---|
| 2004/0162672 A1* | 8/2004 | Kim | G01C 21/3632 701/468 |
| 2007/0222638 A1* | 9/2007 | Chen | G08G 1/095 340/901 |
| 2008/0021641 A1* | 1/2008 | Kim | G01C 21/3632 701/437 |
| 2016/0161270 A1 | 6/2016 | Okumura | |
| 2017/0262709 A1* | 9/2017 | Wellington | G06K 9/6201 |
| 2018/0286227 A1* | 10/2018 | Sorgatz | G08G 1/0112 |

FOREIGN PATENT DOCUMENTS

| | | |
|---|---|---|
| JP | 2004-245837 | 9/2004 |
| JP | 2015-148533 | 8/2015 |
| JP | 2018-503169 | 2/2018 |

\* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-219928, filed Nov. 26, 2018, the content of which is incorporated herein by reference.

BACKGROUND

Field of the Invention

The present invention relates to a vehicle control device, a vehicle control method, and a storage medium.

Description of Related Art

Conventionally, the invention of a device for detecting a plurality of branch routes branching from a forward reference route in a course of a host vehicle in a state in which the host vehicle is automatically driven, selecting a branch route along which the host vehicle is intended to be moved by a driver in accordance with a result of subsequently detecting each of a direction indication operation, an acceleration/deceleration operation, and a steering operation when at least one of the direction indication operation, the acceleration/deceleration operation, and the steering operation of the driver has been detected, and resetting the selected branch route as a new reference route has been disclosed (Japanese Unexamined Patent Application, First Publication No. 2015-148533).

SUMMARY

On the other hand, an intersection can be given as a place where there are a plurality of branch routes. There are intersections with irregular shapes as well as intersections with typical shapes such as crossroads and T-junctions. Although some intersections with irregular shapes have traffic signal installation positions different from those of normal intersections, it may not be possible to appropriately select a state of a traffic signal at intersections with irregular shapes in the conventional technology.

Aspects of the present invention have been made in view of such circumstances and an objective of the present invention is to provide a vehicle control device, a vehicle control method, and a storage medium capable of appropriately selecting a state of a traffic signal at an intersection with an irregular shape.

A vehicle control device, a vehicle control method, and a storage medium according to the present invention adopt the following configurations.

(1): According to an aspect of the present invention, there is provided a vehicle control device including: a recognizer configured to recognize a surrounding situation of a vehicle; and a driving controller configured to control acceleration, deceleration, and steering of the vehicle independently of an operation of an occupant of the vehicle on the basis of a recognition result of the recognizer, wherein, when it is recognized that the vehicle passes through a complex intersection where two or more intersections are combined by turning left or right at the complex intersection, the recognizer excludes at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection.

(2): In the above-described aspect (1), the recognizer recognizes that the vehicle passes through the complex intersection when a sign indicating the complex intersection has been recognized.

(3): In the above-described aspect (1), the recognizer recognizes that the vehicle passes through the complex intersection when a traffic signal provided in correspondence with a second road intersecting a first road on which the vehicle travels before the vehicle turns right or left is not recognized in a prescribed range of a first intersection through which the vehicle first passes between or among the two or more intersections constituting the complex intersection.

(4): In the above-described aspect (1), the recognizer recognizes that the vehicle passes through the complex intersection when there is no stop line in front of a second intersection through which the vehicle subsequently passes between or among the two or more intersections constituting the complex intersection.

(5): In the above-described aspect (1), the recognizer further recognizes that the vehicle passes through the complex intersection on the basis of a position and map information of the vehicle.

(6): In the above-described aspect (1), the recognizer further recognizes that the vehicle passes through the complex intersection on the basis of an operation history of another vehicle different from the vehicle.

(7): According to an aspect of the present invention, there is provided a vehicle control method including: recognizing, by a computer, a surrounding situation of a vehicle; controlling, by the computer, acceleration, deceleration, and steering of the vehicle independently of an operation of an occupant of the vehicle on the basis of a recognition result; and excluding, by the computer, when it is recognized that the vehicle passes through a complex intersection where two or more intersections are combined by turning left or right at the complex intersection in a process of the recognizing, at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection.

(8): According to another aspect of the present invention, there is provided a computer-readable non-transitory storage medium storing a program for causing a computer to: recognize a surrounding situation of a vehicle; control acceleration, deceleration, and steering of the vehicle independently of an operation of an occupant of the vehicle on the basis of a recognition result; and exclude, when it is recognized that the vehicle passes through a complex intersection where two or more intersections are combined by turning left or right at the complex intersection in a recognition process, at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection.

(9): According to another aspect of the present invention, there is provided a vehicle control device including: a recognizer configured to recognize a surrounding situation of a vehicle; and a driving controller configured to control acceleration, deceleration, and steering of the vehicle independently of an operation of an occupant of the vehicle on the basis of a recognition result of the recognizer, wherein, when it is recognized that the vehicle passes through a complex intersection where two or more intersections are combined by turning left or right at the complex intersection, the recognizer makes a rule for selecting a traffic signal whose state is taken into account by the vehicle different as compared with when it is recognized that the vehicle turns right or left at a normal intersection instead of the complex intersection.

In each aspect described above, "recognition of passage" may be replaced with "an increase in an evaluation value indicating the probability of passage (a value represented by the "number of points" in the embodiment)".

According to the above-described aspects (1) to (9), it is possible to appropriately select a state of a traffic signal at an intersection with an irregular shape.

DESCRIPTION OF EMBODIMENTS

Embodiments of a vehicle control device, a vehicle control method, and a storage medium of the present invention will be described below with reference to the drawings. Although a case in which left-hand traffic regulations are applied will be described, it is only necessary to reverse left and right when right-hand traffic regulations are applied.

Figure 4:
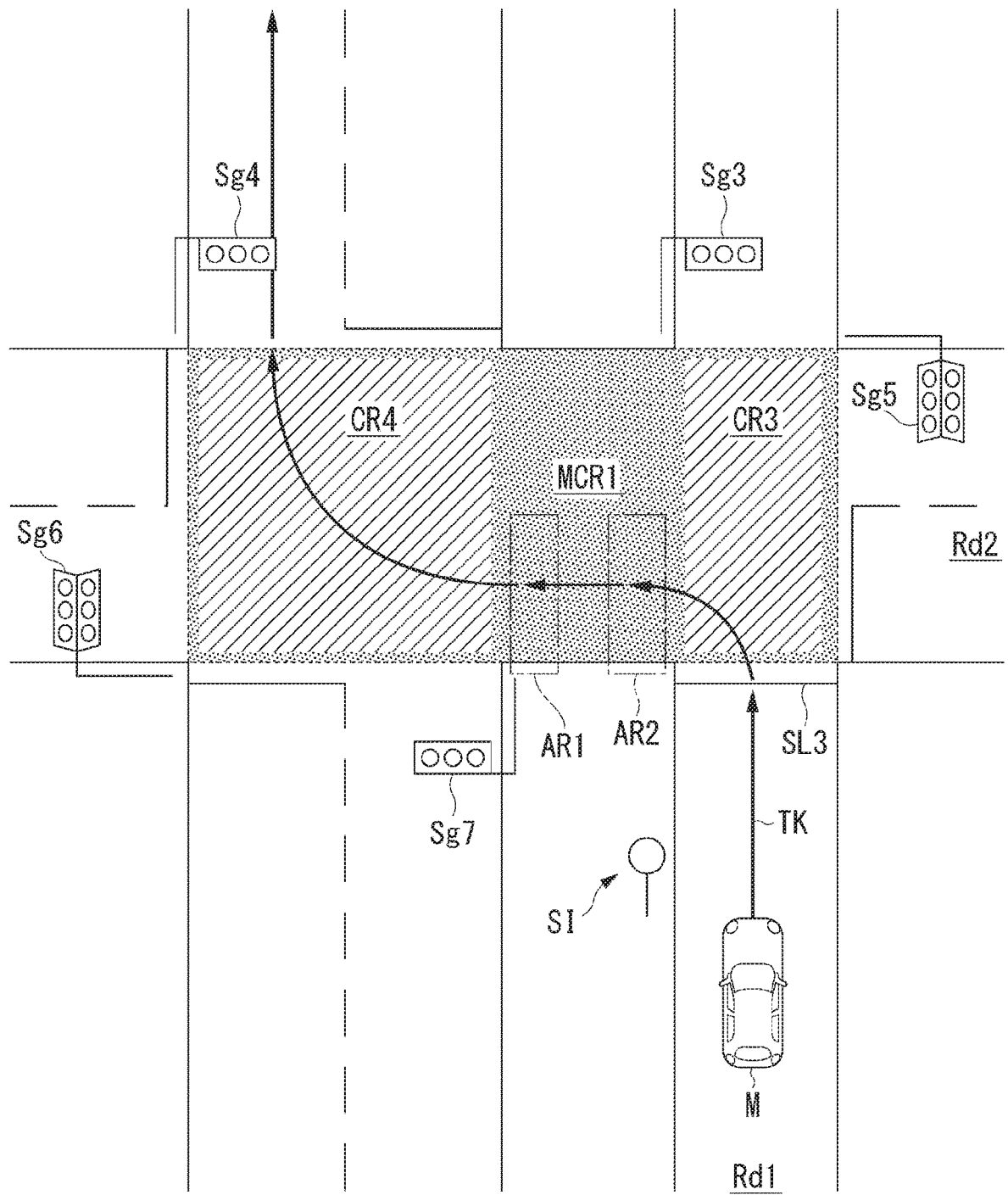
FIG. 4 is a diagram showing an example of a traffic signal to be selected when the host vehicle passes through a complex intersection.

In the present specification, an intersection is defined as a "point where two or more roads intersect". As shown in FIG. 4 to be described below, an intersection configured to partially include two or more intersections is defined as a "complex intersection". Although traffic at the complex intersection is controlled by a group of traffic signals and can be interpreted as an "intersection" in a broad sense, the complex intersection is considered as a set of intersections in the present specification.

[Overall Configuration]

Figure 1:
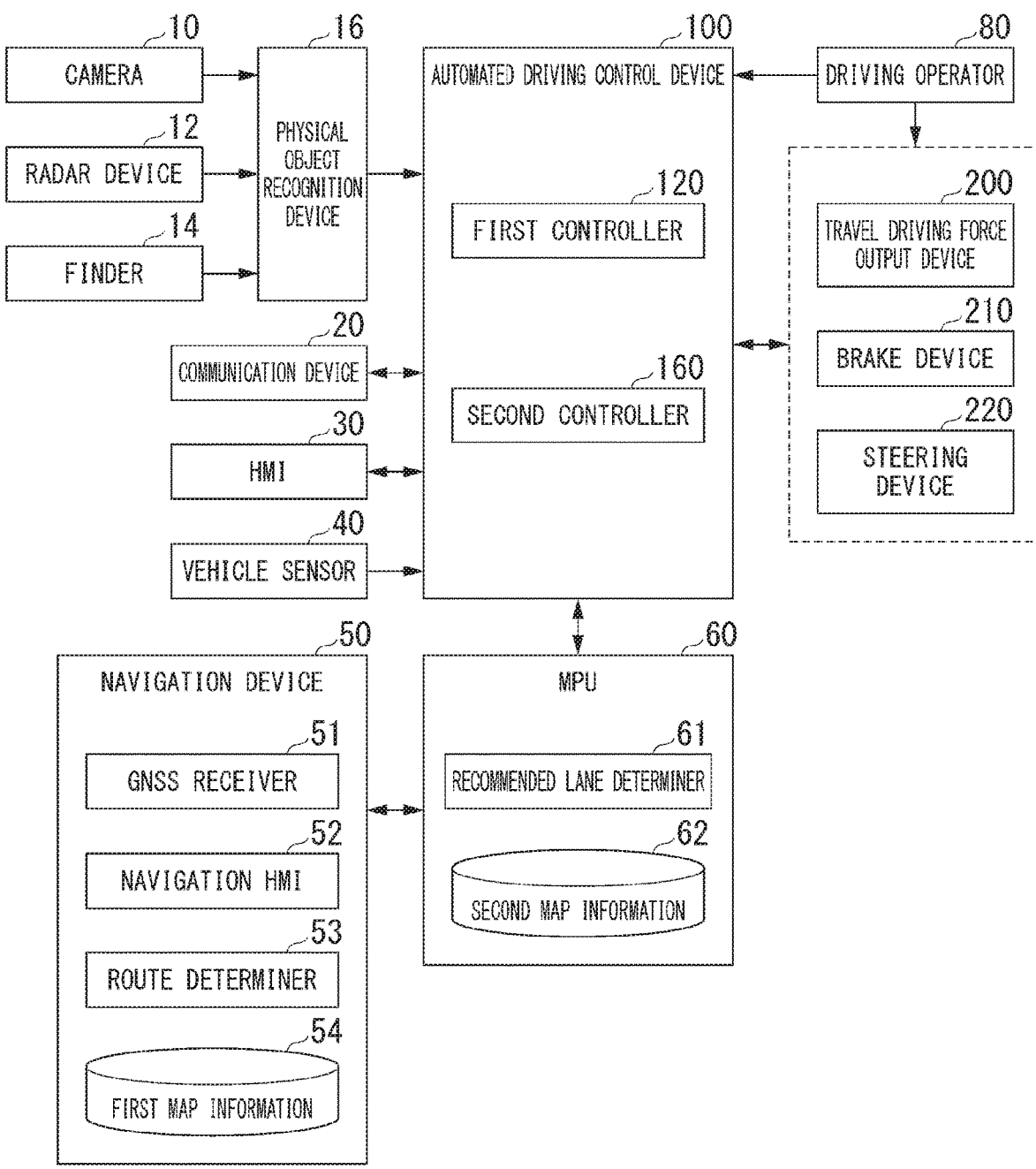
FIG. 1 is a configuration diagram of a vehicle system using a vehicle control device according to an embodiment.

FIG. 1 is a configuration diagram of a vehicle system 1 using a vehicle control device according to an embodiment. For example, a vehicle on which the vehicle system 1 is mounted is, for example, a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power from an electric power generator connected to the internal combustion engine or discharge electric power of a secondary battery or a fuel cell.

For example, the vehicle system 1 includes a camera 10, a radar device 12, a finder 14, a physical object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example, a part of the configuration may be omitted, and another configuration may be further added.

For example, the camera 10 is a digital camera using a solid-state imaging element such as a charge coupled device (CCD) or a complementary metal oxide semiconductor (CMOS). The camera 10 is attached to any position on the vehicle (hereinafter, a host vehicle M) on which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and speed of the physical object in a frequency modulated continuous wave (FM-CW) scheme.

The finder 14 is a light detection and ranging (LIDAR) finder. The finder 14 radiates light to the vicinity of the host vehicle M and measures scattered light. The finder 14 detects a distance to an object on the basis of time from light emission to light reception. The radiated light is, for example, pulsed laser light. The finder 14 is attached to any position on the host vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100. The physical object recognition device 16 may output detection results of the camera 10, the radar device 12, and the finder 14 to the automated driving control device 100 as they are. The physical object recognition device 16 may be omitted from the vehicle system 1.

The communication device 20 communicates with another vehicle present in the vicinity of the host vehicle M using, for example, a cellular network or a Wi-Fi network, Bluetooth (registered trademark), dedicated short range communication (DSRC), or the like or communicates with various types of server devices via a radio base station.

The HMI 30 presents various types of information to an occupant of the host vehicle M and receives an input operation of the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by an occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] with respect to a traveling direction of the vehicle), and determines a recommended lane for each block with reference to the second map information 62. The recommended lane determiner 61 determines what number lane the vehicle travels on from the left. The recommended lane determiner 61 determines the recommended lane so that the host vehicle M can travel along a reasonable traveling route for traveling to a branching destination when there is a branching point in the route on the map.

The second map information 62 is map information which has higher accuracy than the first map information 54. For example, the second map information 62 includes information about a center of a lane, information about a boundary of a lane, or the like. The second map information 62 may include road information, traffic regulations information, address information (an address/zip code), facility information, telephone number information, and the like. The second map information 62 may be updated at any time when the communication device 20 communicates with another device.

For example, the driving operator 80 includes an accelerator pedal, a brake pedal, a shift lever, a steering wheel, a steering wheel variant, a joystick, and other operators. A sensor configured to detect an amount of operation or the presence or absence of an operation is attached to the driving operator 80, and a detection result thereof is output to the automated driving control device 100 or some or all of the travel driving force output device 200, the brake device 210, and the steering device 220.

For example, the automated driving control device 100 includes a first controller 120 and a second controller 160. Each of the first controller 120 and the second controller 160 is implemented, for example, by a hardware processor such as a central processing unit (CPU) executing a program (software). Some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by cooperation between software and hardware. The program may be pre-stored in a storage device such as an HDD or a flash memory of the automated driving control device 100 (a storage device including a non-transitory storage medium) or pre-stored in a removable storage medium such as a DVD or a CD-ROM. The program may be installed in an HDD or a flash memory of the automated driving control device 100 when the storage medium (the non-transitory storage medium) is mounted in a drive device.

Figure 2:
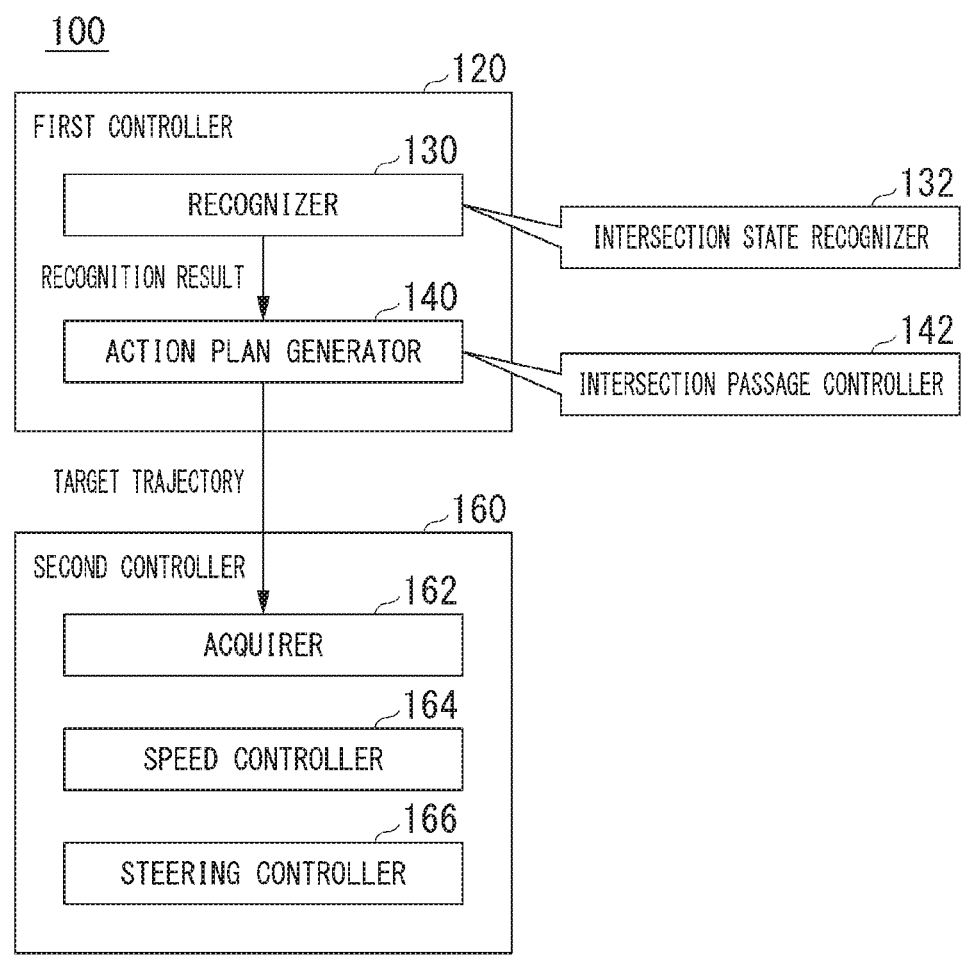
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured.

The recognizer 130 recognizes a state such as a position, velocity, or acceleration of a physical object present in the vicinity of the host vehicle M on the basis of information input from the camera 10, the radar device 12, and the finder 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane in which the host vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the host vehicle M recognized from an image captured by the camera 10. The recognizer 130 may recognize a travel lane by recognizing a traveling path boundary (a road boundary) including a road dividing line, a road shoulder, a curb stone, a median strip, a guardrail, or the like as well as a road dividing line. In this recognition, a position of the host vehicle M acquired from the navigation device 50 or a processing result of the INS may be added. The recognizer 130 recognizes a temporary stop line, an obstacle, red traffic signal, a toll gate, and other road events.

When the travel lane is recognized, the recognizer 130 recognizes a position or orientation of the host vehicle M with respect to the travel lane. For example, the recognizer 130 may recognize a distance of a reference point of the host vehicle M from the center of the lane and an angle formed with respect to a line connecting the center of the lane in the travel direction of the host vehicle M as a relative position and orientation of the host vehicle M related to the travel lane. Alternatively, the recognizer 130 may recognize a position of the reference point of the host vehicle M related to one side end portion (a road dividing line or a road boundary) of the travel lane or the like as a relative position of the host vehicle M related to the travel lane.

The recognizer 130 includes an intersection state recognizer 132 configured to determine a route through which the host vehicle M can pass on the basis of a state of a traffic signal and the like when passing through an intersection. Details of the intersection state recognizer 132 will be described below.

The action plan generator 140 generates a future target trajectory along which the host vehicle M automatically travels (independently of a driver's operation) so that the host vehicle M generally travels in the recommended lane determined by the recommended lane determiner 61 and further copes with a surrounding situation of the host vehicle M. For example, the target trajectory includes a speed element. For example, the target trajectory is represented by sequentially arranging points (trajectory points) at which the host vehicle M is required to arrive. The trajectory point is a point where the host vehicle M is required to reach for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information about the target speed or the target acceleration is represented by an interval between the trajectory points.

The action plan generator 140 may set an automated driving event when the target trajectory is generated. The automated driving event includes a constant-speed traveling event, a low-speed following traveling event, a lane change event, a branching event, a merging event, a takeover event, an intersection passage event, and the like. The action plan generator 140 generates a target trajectory according to the activated event. The action plan generator 140 includes an intersection passage controller 142 to be activated when the intersection passage event is executed. Details of the intersection passage controller 142 will be described below.

The second controller 160 controls the travel driving force output device 200, the brake device 210, and the steering device 220 so that the host vehicle M passes through the target trajectory generated by the action plan generator 140 at a scheduled time.

Returning to FIG. 2, the second controller 160 includes, for example, an acquirer 162, a speed controller 164, and a steering controller 166. The acquirer 162 acquires information of a target trajectory (a trajectory point) generated by the action plan generator 140 and causes the acquired information to be stored in a memory (not shown). The speed controller 164 controls the travel driving force output device 200 or the brake device 210 on the basis of speed elements associated with the target trajectory stored in the memory. The steering controller 166 controls the steering device 220 in accordance with a curvature representing a degree of curve of a target trajectory stored in the memory. For example, processes of the speed controller 164 and the steering controller 166 are implemented by a combination of feed-forward control and feedback control. As one example, the steering controller 166 combines and executes feed-forward control according to the curvature of the road in front of the host vehicle M and feedback control based on a deviation from the target trajectory.

The travel driving force output device 200 outputs a travel driving force (a torque) to driving wheels so as to enable the vehicle to travel. For example, the travel driving force output device 200 includes a combination of an internal combustion engine, an electric motor, a transmission, and the like, and an electronic control unit (ECU) configured to control them. The ECU controls the above-described configuration in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with information input from the second controller 160 or information input from the driving operator 80 so that a brake torque corresponding to a braking operation is output to each wheel. The brake device 210 may include a mechanism for transferring the hydraulic pressure generated by the operation of the brake pedal included in the driving operator 80 to the cylinder via the master cylinder as a backup. The brake device 210 is not limited to the above-described configuration and may be an electronically controlled hydraulic brake device that controls an actuator in accordance with information input from the second controller 160 and transfers the hydraulic pressure of the master cylinder to the cylinder.

For example, the steering device 220 includes a steering ECU and an electric motor. The electric motor, for example, changes a direction of the steering wheels by applying a force to a rack and pinion mechanism. The steering ECU drives the electric motor and causes the direction of the steering wheels to be changed in accordance with the information input from the second controller 160 or the information input from the driving operator 80.

[Intersection Passage Event]

Hereinafter, processes of the intersection state recognizer 132 and the intersection passage controller 142 will be described. The intersection state recognizer 132 recognizes that the host vehicle M passes through the intersection and recognizes any one of passage forms such as going straight ahead, a right turn, and a left turn at the time of passage. For example, the intersection state recognizer 132 compares a route on a map or a recommended route with the second map information 62 and recognizes that the host vehicle M is scheduled to turn right or left at the intersection. Furthermore, the intersection state recognizer 132 recognizes that the host vehicle M approaches the intersection on the basis of an output of the camera 10, the radar device 12, the finder 14, or the physical object recognition device 16 or recognizes that the host vehicle M passes through the intersection when a state in which the host vehicle M has entered the intersection is recognized. When it is recognized that the host vehicle M passes through the intersection, the intersection state recognizer 132 selects a traffic signal (hereinafter referred to as a traffic signal to be selected) whose state is required to be taken into account by the host vehicle M and notifies the intersection passage controller 142 of the action plan generator 140 of the state of the selected traffic signal to be selected. The intersection state recognizer 132 may not transmit a state of a traffic signal other than the traffic signal to be selected to the intersection passage controller 142 or may assign a flag indicating that no consideration is required and transmit the flag to the intersection passage controller 142.

Figure 3:
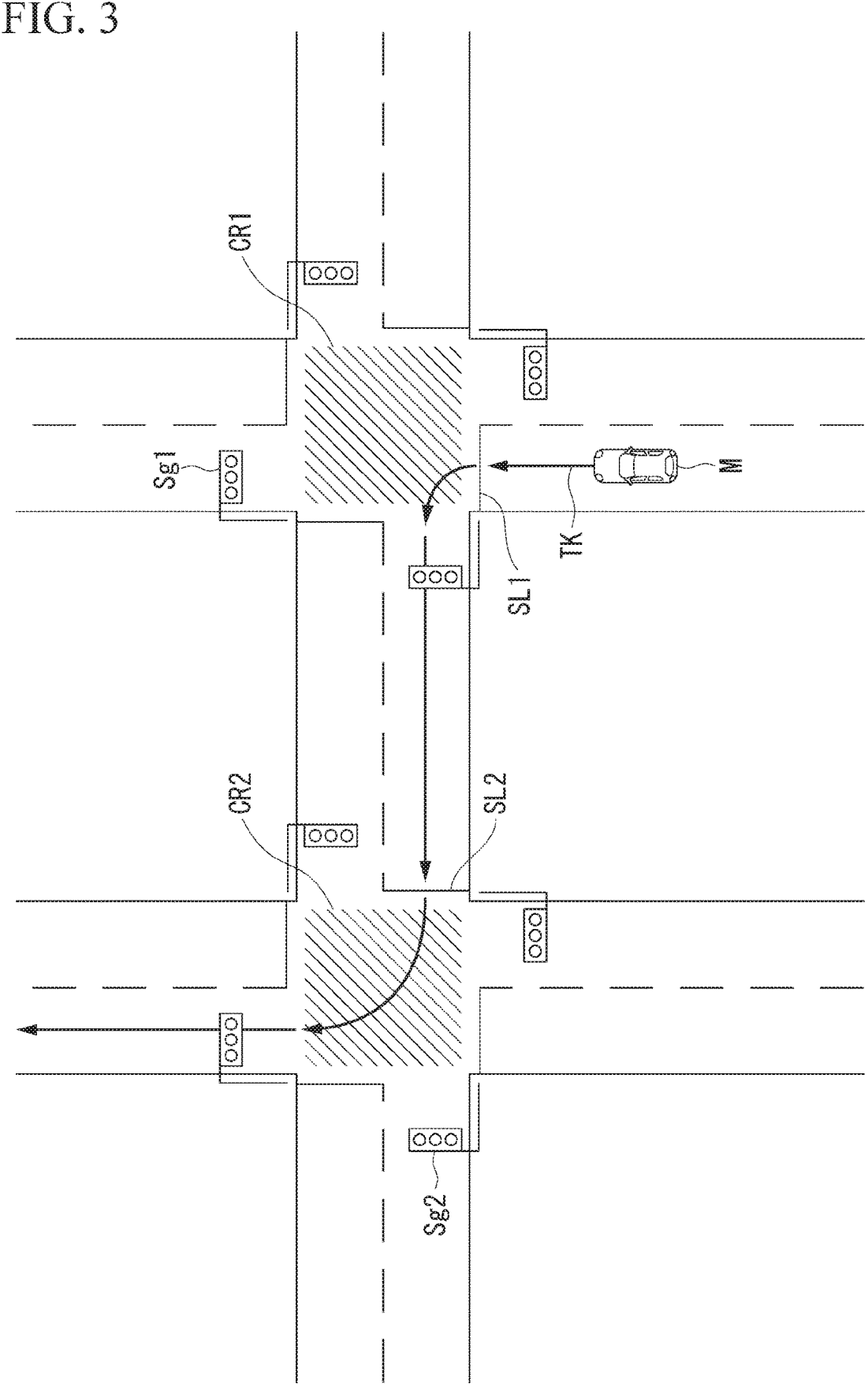
FIG. 3 is a diagram showing an example of a traffic signal to be selected when a host vehicle passes through two normal intersections.

FIG. 3 is a diagram showing an example of a traffic signal to be selected when the host vehicle M passes through two intersections (hereinafter referred to as normal intersections) that are not complex intersections to be described below. In the example of FIG. 3, the host vehicle M is scheduled to turn left at a first normal intersection CR1 and then turn right at a second normal intersection CR2. In FIG. 3, TK is a target trajectory. In this scene, the intersection state recognizer 132 sets all traffic signals at positions directly facing the host vehicle M as traffic signals to be selected in a process in which the host vehicle M travels. In FIG. 3, traffic signals Sg1 and Sg2 are selected as the traffic signals to be selected. For example, the "positions directly facing" the host vehicle M are positions above a lane (a host vehicle lane) where the host vehicle M is present or above an area where the host vehicle lane is virtually extended and at which a signal display surface faces the host vehicle M. Instead of the above, the intersection state recognizer 132 may select a traffic signal to be selected according to a rule that a "traffic signal which is present at a position directly facing the host vehicle M when viewed from a position where there is a stop line and which is closest to the stop line is set as a traffic signal to be selected in a process in which the host vehicle M travels". In the example of FIG. 3, the traffic signal Sg1 is a traffic signal which is present at a position directly facing the host vehicle M when viewed from a position of a stop line SL1 and which is closest to the stop line SL1. The traffic signal Sg2 is a traffic signal which is present at a position directly facing the host vehicle M when viewed from a position of a stop line SL2 and which is closest to the stop line SL2.

When it is recognized that the host vehicle M passes through a "complex intersection" in which two or more intersections are combined by turning right or left at the complex intersection, the intersection state recognizer 132 excludes at least a traffic signal closest to the host vehicle M among traffic signals present at positions capable of being visually recognized from the host vehicle M in a traveling direction of the host vehicle M from traffic signals whose states are required to be taken into account by the host vehicle M in a state in which the host vehicle M has entered the complex intersection.

FIG. 4 is a diagram showing an example of a traffic signal to be selected when the host vehicle M passes through a complex intersection. In the example shown in FIG. 4, intersections CR3 and CR4 are present and traffic at these intersections is controlled by a group of traffic signals Sg3 to Sg7 without being independently controlled. A combination of such two or more intersections is defined as a complex intersection. When the host vehicle M passes through the complex intersection MCR1 shown in FIG. 4, the intersection state recognizer 132 selects the traffic signal to be selected according to a selection rule different from those of the normal intersections CR1 and CR2 shown in FIG. 3. The traffic signals Sg5 and Sg6 are bidirectional traffic signals in which signals are arranged toward both sides.

First, the intersection state recognizer 132 selects the traffic signal Sg3 which is a traffic signal that is present at a position directly facing the host vehicle M when viewed from a position of a stop line SL3 present in the traveling direction of the host vehicle M and that is closest to the stop line SL3 as a traffic signal to be selected. Such selection is performed regardless of whether the intersection through which the host vehicle M passes is a normal intersection or a complex intersection. Thereafter, the intersection state recognizer 132 sets the traffic signal Sg6 in the traveling direction of the host vehicle M as a determination target.

For example, the intersection state recognizer 132 determines whether or not the intersection through which the host vehicle M passes is a complex intersection by comprehensively considering whether or not the following conditions have been satisfied.

<<Conditions>>

(1) There is no stop line in an area AR1 where a stop line should be present.

(2) There is no traffic signal in an area AR2 where a traffic signal is expected to be present at a normal intersection.

(3) Referring to an operation history of another vehicle, the other vehicle is entering the intersection CR4 regardless of the state of the traffic signal Sg6.

(4) There is a sign SI indicating that there is a complex intersection (indicating that there is no other intersection during arrival at the intersection CR3) immediately before arrival at the intersection CR3.

(5) In the second map information 62, information indicating that there is a complex intersection is described.

Figure 5:
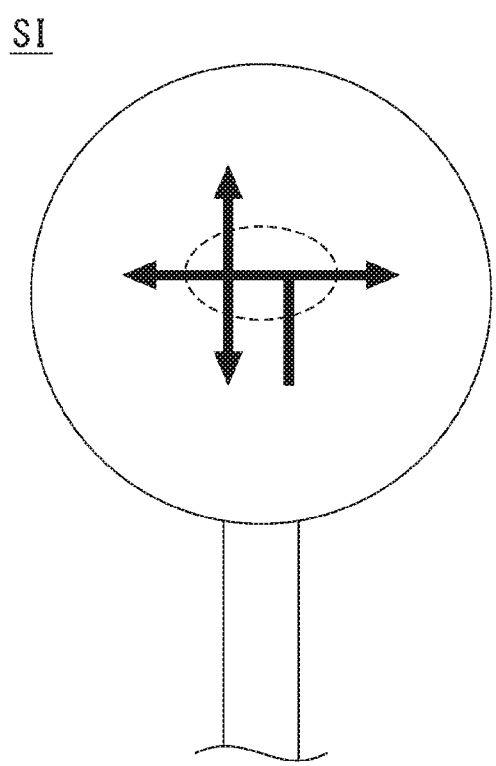
FIG. 5 is a diagram showing an example of a sign.

In the above, the area AR2 is an area in a prescribed range at the first intersection CR3 through which the host vehicle M first passes between or among two or more intersections constituting a complex intersection MCR1 and is an area where a traffic signal is expected to be provided in correspondence with a second road Rd2 intersecting a first road Rd1 on which the host vehicle M travels before making a right turn or a left turn, i.e., an area including a part of a road and a sidewalk (if they are present) within a prescribed distance from a boundary line between an intersection and a road. In the example of FIG. 4, because at least the conditions (1), (2), and (4) are satisfied, the intersection state recognizer 132 determines that the host vehicle M passes through the complex intersection. FIG. 5 is a diagram showing an example of the sign SI. The sign SI has, for example, a form in which a vehicle entering a complex intersection can recognize a structure of the complex intersection and a road on which the vehicle can travel.

For example, the intersection state recognizer 132 applies whether or not the above-described conditions (1) to (5) are satisfied to a prescribed evaluation rule and performs any one of a process (A) of determining that the intersection CR4 is a normal intersection through which the host vehicle M subsequently passes, a process (B) of adding or subtracting the number of points for predicting that the intersection CR4 is a part of the complex intersection to or from the number of accumulated points, and a process (C) in which anything is not performed (without changing a determination at that time). Then, the intersection state recognizer 132 predicts (recognizes) that the intersection CR4 is a part of the complex intersection when the number of accumulated points is greater than or equal to a threshold value (for example, about 12 according to the following evaluation rules). The following evaluation rules and numerical values included in the evaluation rules are merely examples and may be arbitrarily changed. Some of the conditions and evaluation rules may be deleted or added.

<<Evaluation Rules>>

(1) There is a stop line in the area AR1 where a stop line should be present→Normal intersection There is no stop line in the area AR1 where a stop line should be present→Addition of 8 points (2) There is a traffic signal in the area AR2 where a traffic signal is expected to be present at a normal intersection→Subtraction of 5 points If there is a normal intersection, there is no traffic signal in the area AR2 where a traffic signal is expected to be present→Addition of 5 points (3) Another vehicle is entering the intersection CR4 regardless of a state of the traffic signal Sg6→Addition of 7 points (4) There is a sign SI indicating that there is a complex intersection immediately before arrival at the intersection CR3→Addition of 7 points (5) In the second map information 62, information indicating that there is a complex intersection is described→Addition of 9 points When the intersection state recognizer 132 determines that the host vehicle M passes through the complex intersection and further recognizes that the host vehicle M passes through the complex intersection by turning right or left at the complex intersection, a selection rule that "at least a traffic signal closest to the host vehicle M among traffic signals present at positions capable of being visually recognized from the host vehicle M in a traveling direction of the host vehicle M is excluded from traffic signals whose states are required to be taken into account by the host vehicle M in a state in which the host vehicle M has entered the complex intersection" is applied. The traffic signal Sg6 shown in FIG. 4 corresponds to the "closest traffic signal" in this selection rule. Thus, the intersection state recognizer 132 excludes the traffic signal Sg6 from the traffic signals to be selected.

Figure 6:
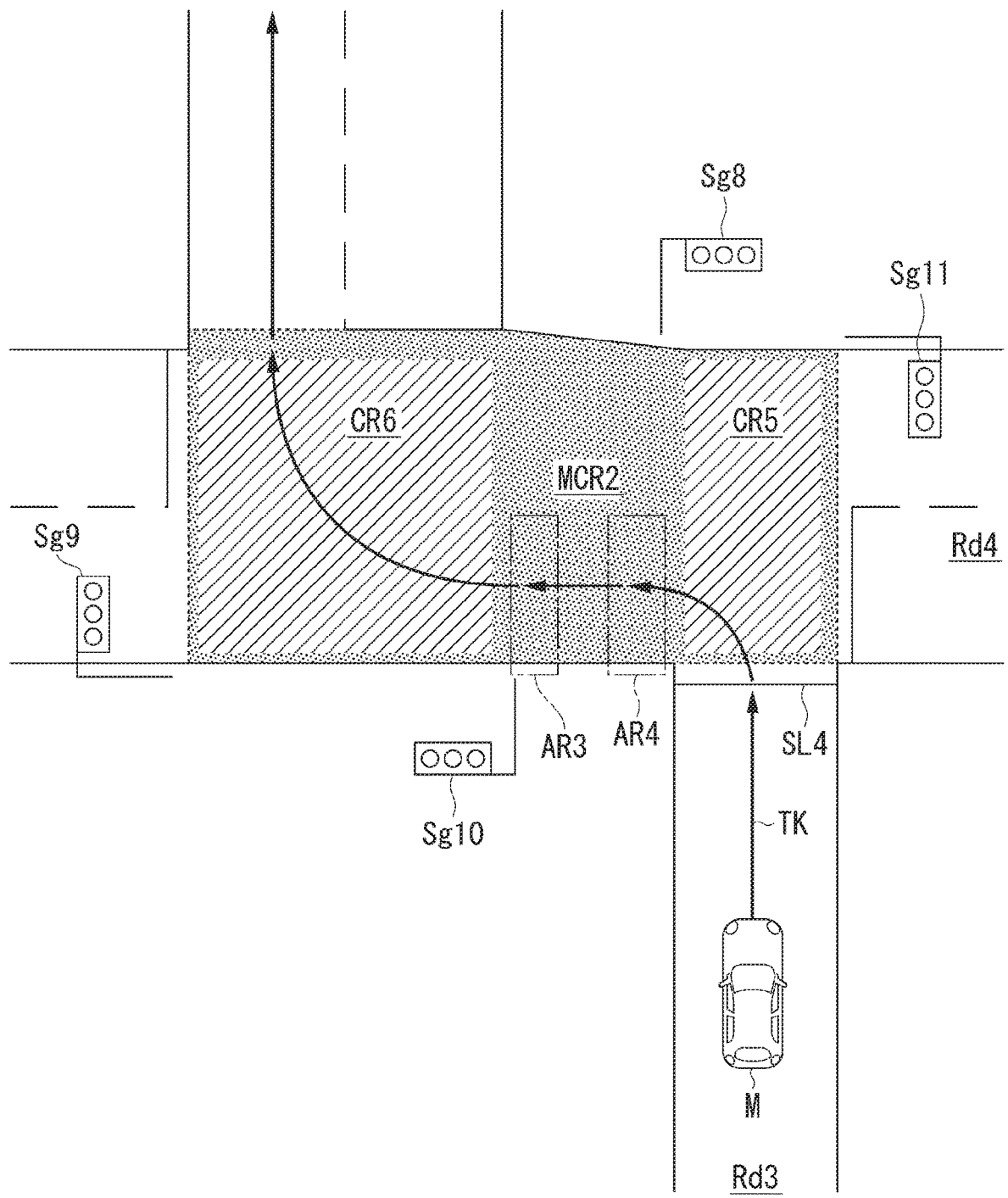
FIG. 6 is a diagram showing an example of a traffic signal to be selected when the host vehicle passes through a complex intersection of another form.

FIG. 6 is a diagram showing an example of a traffic signal to be selected when the host vehicle M passes through a complex intersection of another form. In the example shown in FIG. 6, there are intersections CR5 and CR6 and traffic at these intersections is controlled by a group of traffic signals Sg8 to Sg11 without being independently controlled. Hereinafter, this complex intersection is referred to as a complex intersection MCR2. Even when the host vehicle M passes through the complex intersection MCR2, the intersection state recognizer 132 selects the traffic signal to be selected according to a selection rule different from those of the normal intersections CR1 and CR2 shown in FIG. 3.

First, the intersection state recognizer 132 selects the traffic signal Sg8 which is a traffic signal that is present at a position directly facing the host vehicle M when viewed from a position of the stop line SL4 present in the traveling direction of the host vehicle M and that is closest to the stop line SL4 as a traffic signal to be selected. Such selection is performed regardless of whether the intersection through which the host vehicle M passes is a normal intersection or a complex intersection. Thereafter, the intersection state recognizer 132 sets the traffic signal Sg9 in the traveling direction of the host vehicle M as a determination target.

For example, the intersection state recognizer 132 determines whether or not the intersection through which the host vehicle M passes is a complex intersection by comprehensively considering whether or not the following conditions have been satisfied.

<<Conditions>>

(1) There is no stop line in an area AR3 where a stop line should be present.

(2) There is no traffic signal in an area AR4 where a traffic signal is expected to be present at a normal intersection.

(3) Referring to an operation history of another vehicle, the other vehicle is entering the intersection CR4 regardless of the state of the traffic signal Sg9.

(4) There is a sign SI indicating that there is a complex intersection (indicating that there is no other intersection during arrival at the intersection CR5) immediately before arrival at the intersection CR5.

(5) In the second map information 62, information indicating that there is a complex intersection is described.

In the above, the area AR4 is an area in a prescribed range at the first intersection CR5 through which the host vehicle M first passes between or among two or more intersections constituting a complex intersection MCR2 and is an area where a traffic signal is expected to be provided in correspondence with a second road Rd4 intersecting a first road Rd3 on which the host vehicle M travels before making a right turn or a left turn, i.e., an area including a part of a road and a sidewalk (if they are present) within a prescribed distance from a boundary line between an intersection and a road. In the example of FIG. 6, because at least the conditions (1) and (2) are satisfied, the intersection state recognizer 132 is likely to determine that the host vehicle M passes through the complex intersection.

When the intersection state recognizer 132 determines that the host vehicle M passes through the complex intersection and further recognizes that the host vehicle M passes through the complex intersection by turning right or left at the complex intersection, a selection rule that "at least a traffic signal closest to the host vehicle M among traffic signals present at positions capable of being visually recognized from the host vehicle M in a traveling direction of the host vehicle M is excluded from traffic signals whose states are required to be taken into account by the host vehicle M in a state in which the host vehicle M has entered the complex intersection" is applied. The traffic signal Sg9 shown in FIG. 6 corresponds to the "closest traffic signal" in this selection rule. Thus, the intersection state recognizer 132 excludes the traffic signal Sg9 from the traffic signals to be selected.

The intersection passage controller 142 generates a target trajectory on the basis of the state of the signal selected as the traffic signal to be selected by the intersection state recognizer 132 (particularly, performs acceleration/deceleration control including stopping). The intersection passage controller 142 causes the host vehicle M to travel without taking into account the state of the traffic signal excluded from the traffic signals to be selected by the intersection state recognizer 132. Needless to say, even if the state of the traffic signal is not taken into account, the intersection passage controller 142 causes the host vehicle M to be decelerated or stopped on the basis of the presence of pedestrian crossings, pedestrians, bicycles, and other vehicles.

[Processing Flow]

Figure 7:
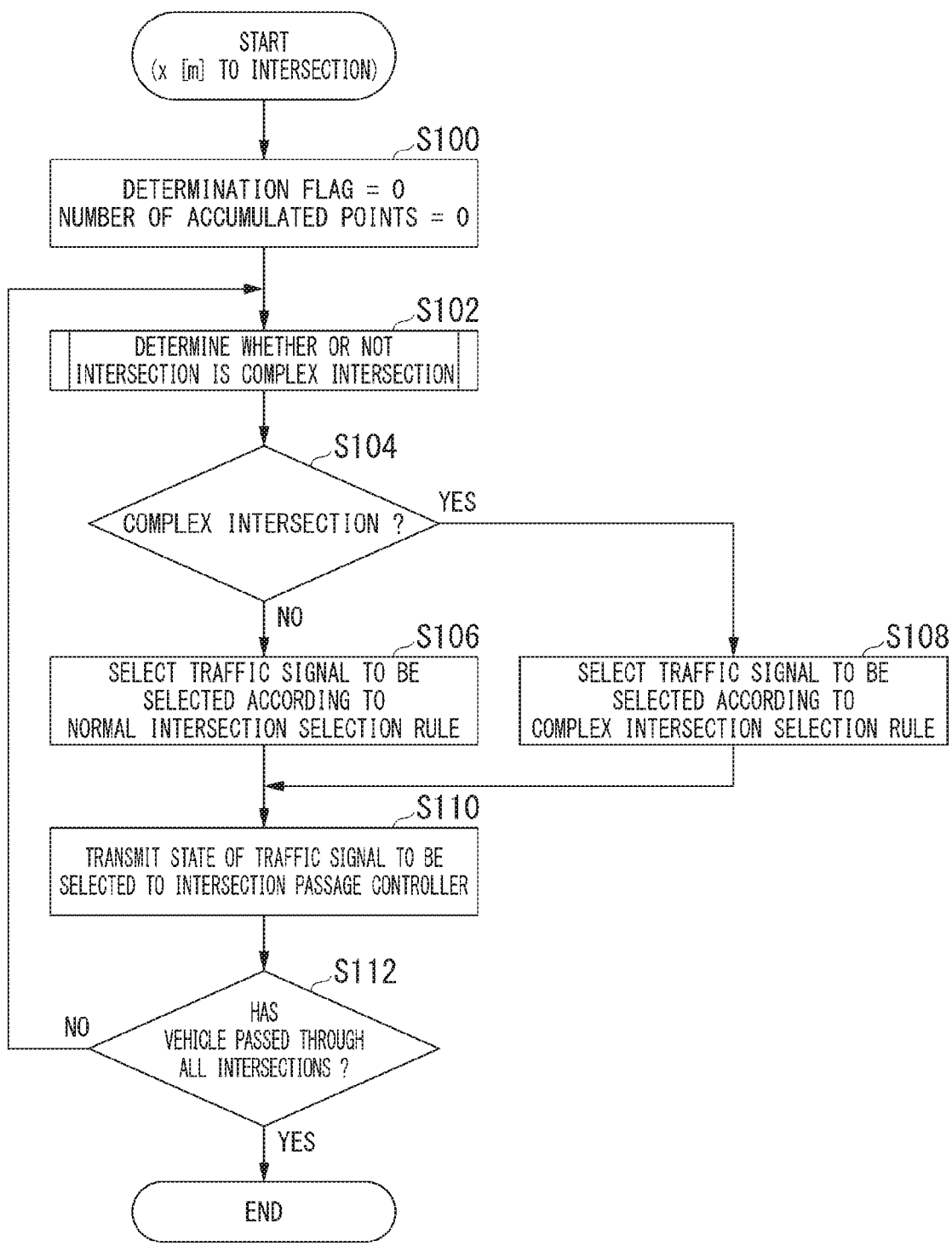
FIG. 7 is a flowchart (part 1) showing an example of a flow of a process to be executed by an intersection state recognizer.

FIG. 7 is a flowchart (part 1) showing an example of a flow of a process to be executed by the intersection state recognizer 132. For example, the process of the present flowchart is started when a distance from the host vehicle M to an intersection is within a prescribed distance x[m].

First, the intersection state recognizer 132 sets an initial value of zero for each of a determination flag and the number of accumulated points (step S100). The significance thereof will be described below.

Next, the intersection state recognizer 132 performs a process of determining whether or not the host vehicle M passes through a complex intersection (step S102). Details of the processing of the present step will be described below with reference to FIG. 8. It is determined whether or not the host vehicle M passes through the complex intersection as a result of the processing of step S102 (step S104). When it is not determined that the host vehicle M passes through the complex intersection, the intersection state recognizer 132 selects a traffic signal to be selected according to a normal intersection selection rule (step S106). On the other hand, when it determined that the host vehicle M passes through the complex intersection, the intersection state recognizer 132 selects a traffic signal to be selected according to a complex intersection selection rule (step S108). Then, the intersection state recognizer 132 notifies the intersection passage controller 142 of a state of the traffic signal to be selected (step S110). The intersection state recognizer 132 executes such a process until the host vehicle M passes through all intersections (step S112). For example, the term "passing through all intersections" indicates that there are no intersections recognized within a prescribed distancex[m] after the process of the flowchart of FIG. 7 is started.

Figure 8:
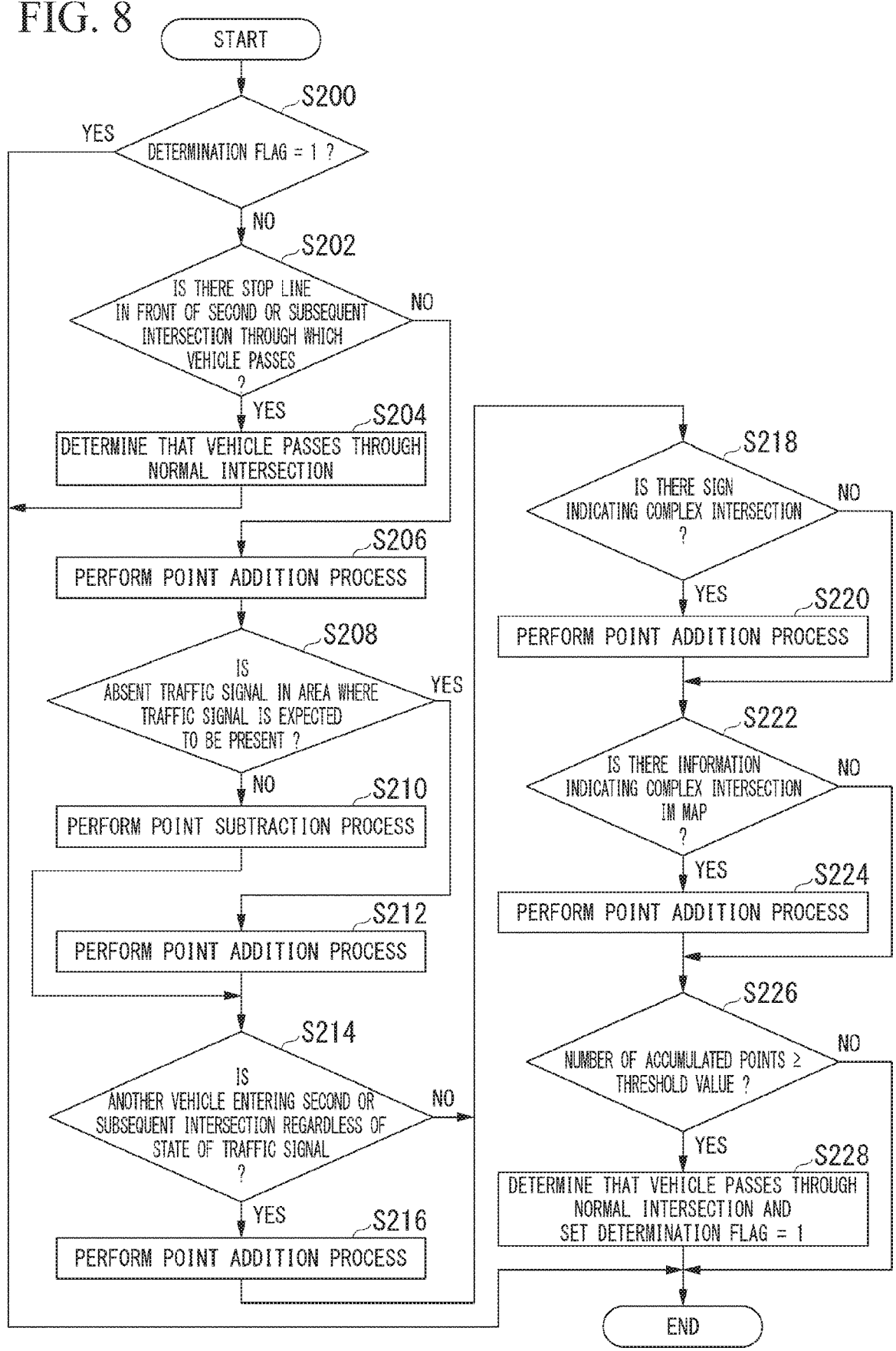
FIG. 8 is a flowchart (part 2) showing an example of a flow of a process to be executed by the intersection state recognizer.

FIG. 8 is a flowchart (part 2) showing an example of a flow of a process to be executed by the intersection state recognizer 132. The process of the present flowchart corresponds to the processing of step S102 in FIG. 7.

First, the intersection state recognizer 132 determines whether or not a determination flag is 1 (step S200). The determination flag is a flag that is maintained at 1 when it is determined that the host vehicle M passes through the complex intersection at least once after the flowchart of FIG. 7 is started. When the determination flag is 1, the intersection state recognizer 132 maintains the determination indicating that the host vehicle M passes through the complex intersection and ends the process of the flowchart of FIG. 8.

When the determination flag is not 1 (i.e., remains zero), the intersection state recognizer 132 determines whether or not there is a stop line (within a prescribed distance) in front of a second or subsequent intersection through which the host vehicle M passes (step S202). When it is determined that there is a stop line, the intersection state recognizer 132 determines that the host vehicle M passes through a normal intersection (step S204).

Even if there is a complex intersection as a whole, an intersection through which the host vehicle M initially passes is determined to be a normal intersection. In the example of FIG. 4, because the traffic signal to be selected is selected according to the normal intersection selection rule with respect to the intersection CR3, the traffic signal Sg3 becomes the traffic signal to be selected. Then, a determination result is switched from the normal intersection to the complex intersection according to the determination process after step S206 until the host vehicle M passes through the next intersection and the determination result is maintained until the host vehicle M passes through all the intersections. In the example of FIG. 4, the traffic signal to be selected is selected according to the complex intersection rule with respect to the intersection CR4. The same applies to the example of FIG. 6. The flowcharts of FIG. 7 and FIG. 8 represent such switching of determination results.

When it is determined that there is no stop line (within the prescribed distance) in front of the second or subsequent intersection through which the host vehicle M passes, the intersection state recognizer 132 adds the predetermined number of points to the number of accumulated points (step S206). Next, the intersection state recognizer 132 determines whether or not a traffic signal is absent in an area where a traffic signal is expected to be present (step S208). When there is a traffic signal in an area where a traffic signal is expected to be present, the intersection state recognizer 132 subtracts the predetermined number of points from the number of accumulated points (step S210). On the other hand, when there is no traffic signal in an area where a traffic signal is expected to be present, the intersection state recognizer 132 adds the predetermined number of points to the number of accumulated points (step S212). A case in which the number of areas where traffic signals are expected to be present is two or more, there is a traffic signal in an area among the areas, and there is no traffic signal in another area among the areas is conceivable. In this case, point addition/subtraction processes may not be performed or either the addition process or the subtraction process may be performed.

Next, the intersection state recognizer 132 determines whether or not another vehicle is entering the second or subsequent intersection regardless of the state of the traffic signal (step S214). When it is determined that another vehicle is entering the second or subsequent intersection regardless of the state of the traffic signal, the intersection state recognizer 132 adds the predetermined number of points to the number of accumulated points (step S216).

Next, the intersection state recognizer 132 determines whether or not there is a sign indicating a complex intersection in front of the first intersection (step S218). If it is determined that there is a sign indicating a complex intersection in front of the first intersection, the intersection state recognizer 132 adds the predetermined number of points to the number of accumulated points (step S220).

Next, the intersection state recognizer 132 determines whether or not information indicating that the intersection through which the host vehicle M passes is a complex intersection is described in the second map information 52 (step S222). When it is determined that information indicating that the intersection through which the host vehicle M passes is a complex intersection is described in the second map information 52, the intersection state recognizer 132 adds the predetermined number of points to the number of accumulated points (step S224).

Then, the intersection state recognizer 132 determines whether or not the number of accumulated points is greater than or equal to a threshold value (step S226). When the number of accumulated points is greater than or equal to the threshold value, the intersection state recognizer 132 determines that the host vehicle M passes through the complex intersection and sets the determination flag to 1 (step S228).

According to such a process, the automated driving control device 100 can appropriately select a state of a traffic signal at an intersection with an irregular shape. As a result, it is possible to minimize the occurrence of a situation in which the host vehicle M stops at a position where the host vehicle M does not originally need to stop, thereby contributing to smooth traffic.

According to the above-described embodiment, a vehicle control device (the automated driving control device 100) includes a recognizer (130) configured to recognize a surrounding situation of a vehicle (the host vehicle M); and a driving controller (140 or 160) configured to control acceleration, deceleration, and steering of the vehicle independently of an operation of an occupant of the vehicle on the basis of a recognition result of the recognizer, wherein, when it is recognized that the vehicle passes through a complex intersection where two or more intersections are combined by turning left or right at the complex intersection, the recognizer excludes at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection, so that it is possible to appropriately select a state of a traffic signal at an intersection with an irregular shape.

[Hardware Configuration]

Figure 9:
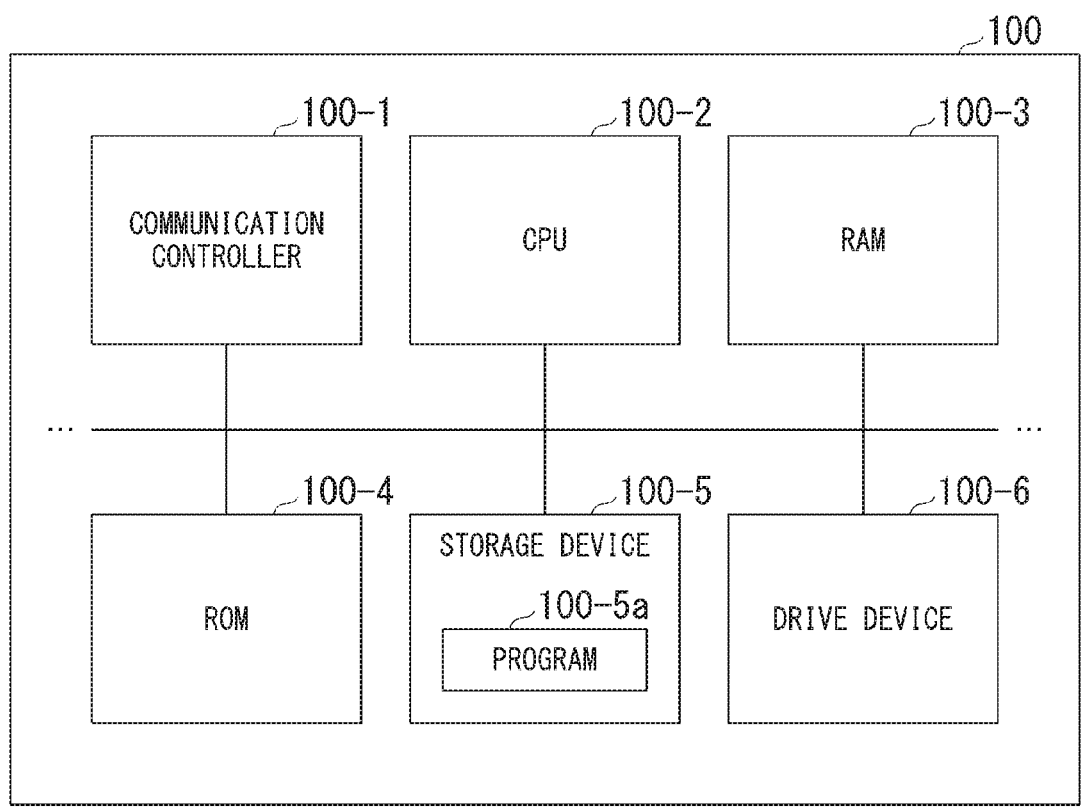
FIG. 9 is a diagram showing an example of a hardware configuration of an automated driving control device of the embodiment.

FIG. 9 is a diagram showing an example of a hardware configuration of the automated driving control device 100 of the embodiment. As shown in FIG. 9, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are mutually connected by an internal bus or a dedicated communication line. The communication controller 100-1 communicates with components other than the automated driving control device 100. A program 100-5a executed by the CPU 100-2 is stored in the storage device 100-5. This program is loaded to the RAM 100-3 by a direct memory access (DMA) controller (not shown) or the like and executed by the CPU 100-2. Thereby, one or both of the first controller 120 and the second controller 160 are implemented.

The embodiment described above can be implemented as follows.

A vehicle control device including:
a storage device configured to store a program; and
a hardware processor,
wherein the hardware processor executes the program stored in the storage device to:
recognize a surrounding situation of a vehicle;
control acceleration, deceleration, and steering of the vehicle independently of an operation of an occupant of the vehicle on the basis of a recognition result; and
exclude, when it is recognized that the vehicle passes through a complex intersection where two or more intersections are combined by turning left or right at the complex intersection in a recognition process, at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection.

Although modes for carrying out the present invention have been described using embodiments, the present invention is not limited to the embodiments, and various modifications and substitutions can also be made without departing from the scope and spirit of the present invention.

What is claimed is:

1. A vehicle control device comprising a processor, the processor being configured to:
recognize a surrounding situation of a vehicle; and
control acceleration, deceleration, and steering of the vehicle independently of an operation of an occupant of the vehicle on the basis of the recognized surrounding situation of the vehicle,
wherein, when it is recognized that the vehicle passes through a complex intersection where two or more intersections are combined by turning left or right at the complex intersection, the processor excludes at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection, and
the processor recognizes that the vehicle passes through the complex intersection when a traffic signal provided in correspondence with a second road intersecting a first road on which the vehicle travels before the vehicle turns right or left is not recognized in a prescribed range of a first intersection through which the vehicle first passes between or among the two or more intersections constituting the complex intersection.

2. The vehicle control device according to claim 1, wherein the processor recognizes that the vehicle passes through the complex intersection when a sign indicating the complex intersection has been recognized.

3. The vehicle control device according to claim 1, wherein the processor further recognizes that the vehicle passes through the complex intersection on the basis of a position and map information of the vehicle.

4. The vehicle control device according to claim 1, wherein the processor further recognizes that the vehicle passes through the complex intersection on the basis of an operation history of another vehicle different from the vehicle.

5. A vehicle control device comprising a processor, the processor being configured to:
recognize a surrounding situation of a vehicle; and
control acceleration, deceleration, and steering of the vehicle independently of an operation of an occupant of the vehicle on the basis of the recognized surrounding situation of the vehicle,
wherein, when it is recognized that the vehicle passes through a complex intersection where two or more intersections are combined by turning left or right at the complex intersection, the processor excludes at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection, and
wherein the processor recognizes that the vehicle passes through the complex intersection when there is no stop line in front of a second intersection through which the vehicle subsequently passes between or among the two or more intersections constituting the complex intersection.

6. A computer-readable non-transitory storage medium storing a program for causing a computer to:
recognize a surrounding situation of a vehicle;
control acceleration, deceleration, and steering of the vehicle independently of an operation of an occupant of the vehicle on the basis of the recognized surrounding situation of the vehicle; and
exclude, when it is recognized that the vehicle passes through a complex intersection where two or more intersections are combined by turning left or right at the complex intersection in a recognition process, at least a traffic signal closest to the vehicle among traffic signals present at positions capable of being visually recognized from the vehicle in a traveling direction of the vehicle from traffic signals whose states are required to be taken into account by the vehicle in a state in which the vehicle has entered the complex intersection, wherein the recognizing of the surrounding situation of the vehicle includes recognizing that the vehicle passes through the complex intersection when there is no stop line in front of a second intersection through which the vehicle subsequently passes between or among the two or more intersections constituting the complex intersection.

* * * * *